Jacob G. Robinson
INVENTOR.

April 17, 1956  J. G. ROBINSON  2,742,028
VALVE MECHANISM
Filed Nov. 28, 1952  2 Sheets-Sheet 2
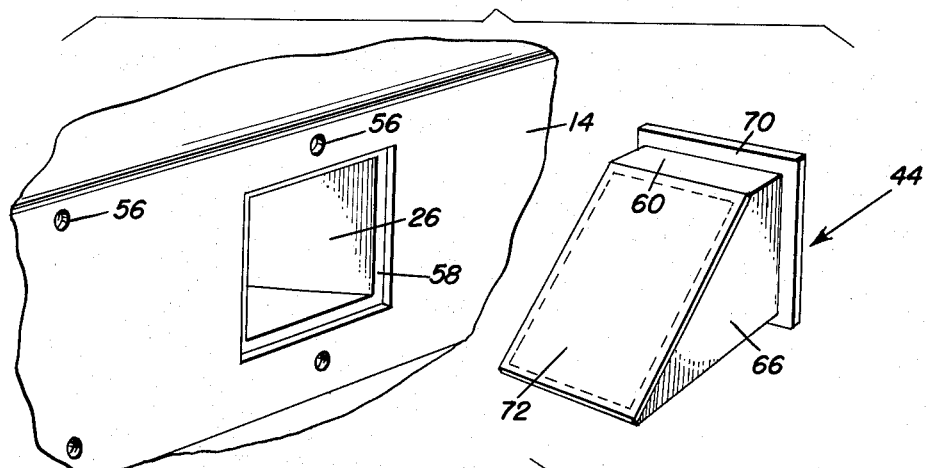
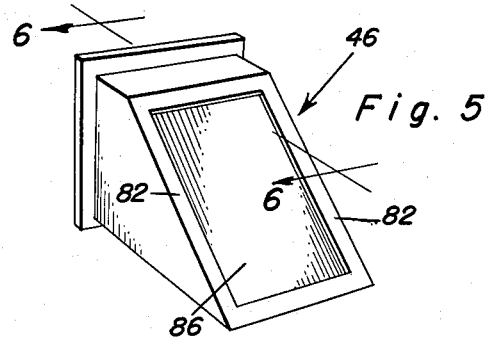
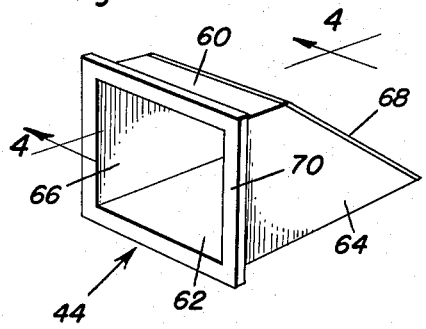
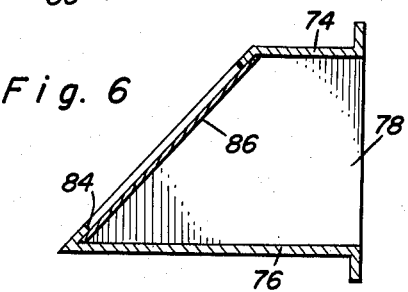
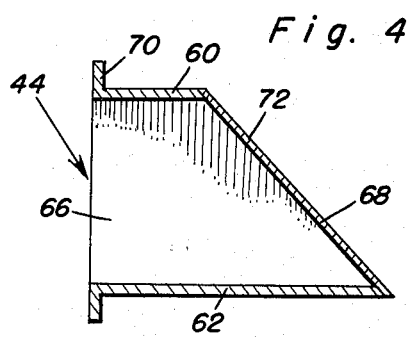
Jacob G. Robinson
INVENTOR.
BY *Clarence A. O'Brien*
*and Harvey B. Jacobson*
Attorneys United States Patent Office 2,742,028
Patented Apr. 17, 1956

2,742,028

VALVE MECHANISM

Jacob G. Robinson, Greenwood, Ind.

Application November 28, 1952, Serial No. 323,016

2 Claims. (Cl. 123—79)

This invention comprises normal and useful improvements in a valve mechanism and more specifically pertains to a novel valve mechanism specifically adapted for internal combustion engines and which shall be adapted to improve the flow of gases into and out of the combustion chambers of internal combustion engines and will permit the utilizing of higher compression ratios therein for a given fuel.

The principal object of this invention is to provide a valve assembly which will more effectively control the inflow of a combustible mixture into the combustion chamber, and the discharge of the exhaust products therefrom.

A further important object of the invention is to provide a valve assembly wherein a valve member controlling flow of gases into and out of the combustion chamber may be operated at a lower temperature thereby permitting the use of higher compression ratios within the combustion chambers of the internal combustion engine.

A still further object of the invention is to provide a valve assembly wherein the heretofore necessary valve driving mechanisms, with their attended problems of lubrication, timing and cooling shall be eliminated from the fuel intake and the exhaust valves of the engine.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an exploded perspective view of a portion of a cylinder head and of a valve assembly detached therefrom;

Figure 3 is a perspective view taken from the inlet side, of an inlet valve assembly;

Figure 4 is a vertical sectional taken substantially upon the plane indicated by the section line 4—4 of Figure 3;

Figure 5 is a view taken from the inlet side of an exhaust valve assembly in accordance with this invention; and, Figure 6 is a vertical longitudinal sectional view taken substantially upon the plane indicated by the section line 6—6 of Figure 5.

Figure 1:
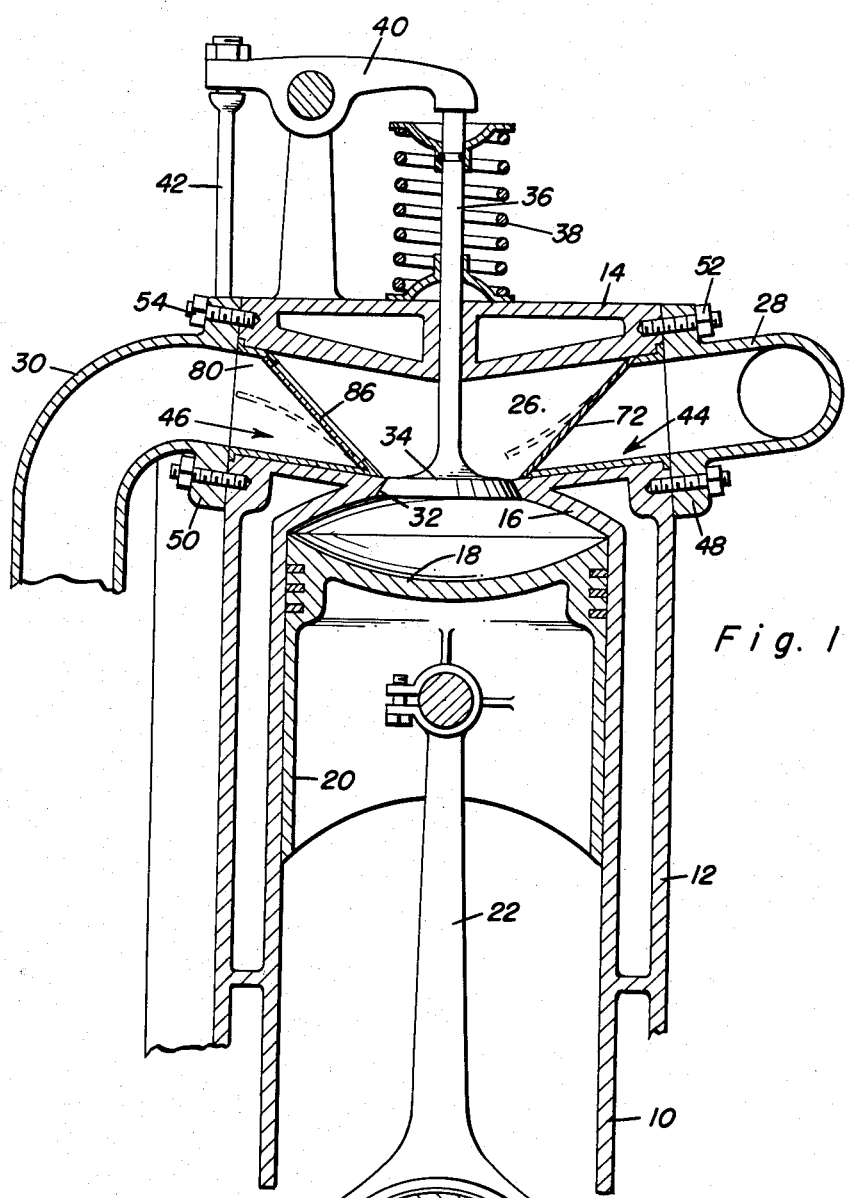
Figure 1 is a vertical central sectional through a portion of an internal combustion engine cylinder showing the manner in which the valve assembly of this invention is applied to the cylinder head thereof, the piston of the internal combustion engine being indicated at the upper end of its stroke.

Referring first to Figure 1 it will be seen that a cylinder 10 of an internal combustion engine is provided with an integral water cooling jacket 12, which also extends into the cylinder head 14 which may constitute an integral portion of the cylinder. The cylinder head includes a top wall portion 16 forming a part of a combustion chamber, the other part of which is formed by the internal walls of the cylinder 10 and by the upper surface portion 18 of a piston 20 slidable within the cylinder and connected by the usual connecting rod 22 with a portion of the engine crank shaft 24 in a well known manner.

Extending transversely through the cylinder head 14 is a passage 26 by means of which combustion products are introduced from an intake manifold 28, from any suitable source such as a carburetor or the like, not shown, enter the interior of the cylinder. The passage 26 likewise communicates with an exhaust manifold 30 by which exhaust products discharged from the combustion chamber of the cylinder are delivered through a muffler of a motor vehicle or are disposed of in any other suitable manner.

Customarily, internal combustion engines of this general type are provided with a separate intake and exhaust valve for controlling the flow of the combustible mixture into the combustion chamber and for controlling the flow of the exhaust products therefrom. Such valves are generally of the well known poppet type and are actuated by cams and valve lifters of various types. In such valve assemblies the poppet valves are usually spring urged into closed position upon their seats by valve springs surrounding and secured to the valve stems, the valves being opened against the resistance of these springs by the aforementioned valve operating mechanism in timed relation to the position of the piston in its operation.

In the present invention there is provided a different type of valve assembly for controlling the flow of combustion products into and the discharge of exhaust gas from the combustion chamber, wherein the number of operating parts is reduced to a minimum, wherein the elements of the valve assembly are associated in a novel and improved manner and whereby the operating conditions for the valve assembly are greatly improved.

Thus, there is provided a valve seat 32 disposed in the portion 16 of the cylinder head and communicating with the passage 26. This valve seat is controlled by a poppet valve 34 which constitutes, in the present invention, a main valve controlling communication between the passage 26 and the combustion chamber. The valve 34 is provided with a valve stem 36 while a closing spring 38 of conventional design is provided for yieldingly urging the valve 34 to its seated position upon the valve seat 32. A suitable valve actuated rocker arm 40 controlled by a push rod 42 which in turn is actuated by suitable valve operating mechanism, not shown, is employed to open valve 34 from its seat 32 at properly timed periods in the cycle of operation of the engine, as set forth hereinafter.

Disposed at opposite ends of the passage 26, and on opposite sides of the main valve 34, are a pair of valve assemblies indicated generally by the numerals 44 and 46 and which respectively constitute the fuel inlet and exhaust valves and constituting non-return or one way valves.

The valve assemblies 44 and 46 are of a compact construction and are adapted, as shown in Figure 1, to be disposed entirely inside the passage 26 of the engine cylinder head, and to be retained in operative position by the flanges 48 and 50 respectively of the intake and exhaust manifolds 28 and 30, which flanges are retained as by fasteners 52 and 54 engaging in suitable screw-threaded bores 56, see Figure 2, provided in the cylinder head.

The opposite ends of the passage 26 are provided with recessed shouldered portions 58 for a purpose subsequently set forth.

Referring now more particularly to Figures 3 and 4, it will be seen that the intake valve assembly 44 consists of a tube or sleeve which is rectangular in cross section, the same including a relatively short top wall 60 and a relatively long parallel bottom wall 62 together with coextensive parallel side walls 64 and 66. The side walls have inclined edges 68 which extend from the inward end of the top wall to the bottom wall. The outer ends of the top, bottom and side walls are joined by a rectangular outwardly extending rim or flange 70 which is of appropriate size to snugly fit in the shouldered recess 58 of Figure 2, as clearly shown in Figure 1.

The valve cage of the valve assembly 44 is provided with a resilient sheet of material 72 which constitutes a reed valve for the assembly. The valve 72 is welded or otherwise rigidly secured at its upper edge to the top wall 60, and is adapted to overlie the inclined edges 68 of the side walls and the inner edge of the bottom wall 62. The valve member 72 is thus capable of flexing from the full line position shown in Figure 1 to the dotted line position shown therein. The outer edges of the bottom wall 62 and of the inclined edges 68 of the two side walls thus constitute a valve seat for the reed valve 72. The inherent resiliency of the sheet metal valve member 72 normally retains the latter in seated engagement upon its valve seat. However, when a slight pressure is applied to the valve member from the inside of the valve cage, the valve will be readily moved from its closed position, shown in full lines in Figure 1, to its dotted line position, whereby fluid may flow through the valve assembly.

Referring again to Figure 1, it will be apparent that when the valve is open, fluid flowing from the intake manifold 28 will be directed downwardly by this valve towards the valve seat 32 and from thence into the combustion engine of the chamber. It will also be observed that when the main valve 34 is open in conjunction with the intake valve 72, that the incoming charge of combustible mixture will impinge upon the bottom or under surface of the main valve 34 thereby cooling the same as well as cooling the valve seat.

The exhaust valve assembly 46 is very similar in construction to that of the intake valve assembly, the same including a valve cage consisting of a sleeve or tube of substantially rectangular cross section and having a relatively short top wall 74 with a relatively long bottom wall 76, and joined by a pair of side walls 78 and 80, see Figure 1, which side walls are coextensive and have inclined edges 82 thereon. An opening 84 is defined which is bounded by the edges 82, and the downturned and upturned edges of the top and bottom wall 74 and 76 respectively.

As in the intake valve assembly, the exhaust valve assembly is likewise provided with a flexible reed or sheet 86 constituting a valve member closing the inner end of the valve cage. The sheet 86 is welded or otherwise secured to the inside surface and lower portion of the inclined extremity of the valve cage, and is inherently yieldingly held in valve closing position as shown in full lines in Figure 1, but may be flexed to its open position as shown in dotted lines therein.

The arrangement of this valve is such that it will open in response to the imposition of the exhaust pressure thereagainst from the passage 26, but will promptly close when the pressure thereagainst is relieved.

It will thus be apparent that both of the valve assemblies constitute one way or non-return valves which are pressure opened and are inherently resiliently closed.

The operation of the valve assembly is as follows:

Starting with the position of the piston and valve shown in Figure 1, which may be regarded as the beginning of the piston intake stroke, the main valve 34 is opened by its actuating mechanism including the members 40 and 42 and remains open during the entire down stroke of the piston. As the piston moves downwardly, the suction produced in the combustion chamber and the passage 26 will open the valve 72 and draw in a charge of combustible mixture from the manifold 28 until the combustion chamber is charged. Upon the completion of the piston downstroke, and when the latter starts its upward or compression stroke, the main valve 34 is closed, and as the pressure equalizes on both sides of the valve 72, the latter likewise closes.

The valves 34, 72 and 86 remain closed upon the up stroke or compression stroke of the piston. At the top of the compression stroke, the parts being again in the position shown in Figure 1, the compressed charge in the combustion chamber is ignited and the piston starts downwardly upon its power stroke. When the piston completes its power stroke and starts upwardly again on its exhaust stroke, the main valve 34 is opened by the valve operating mechanism. The exhaust sparks then pass into the passage 26, pressing against the valves 72 and 86. Since the former opens only outwardly, it remains closed, being held closed by this exhaust pressure, while the valve member 86 is opened to the dotted lines as shown in Figure 1 and the exhaust produces discharged through the exhaust conduit 30.

From the foregoing, it will be apparent that the intake valve assembly 44 is protected against the high temperatures prevailing during the combustion and power stroke, since the main valve 34 seals the combustion chamber from the intake and exhaust valve assemblies 44 and 46 during this portion of the cycle of operation of the engine.

When the intake valve is open on the intake stroke, the incoming charge will be deflected by the flexible intake valve member downwardly against the valve seat and valve head of the main valve 34 thereby cooling the latter to prevent overheating of the same. Upon the exhaust stroke, when the main valve 34 and the exhaust valve 86 are open, the combustion parts passing out of the combustion chamber will strike the water cooled head of the cylinder head and then pass outwardly above the valve member 86, the latter being in its dotted line position as shown in Figure 1, whereby the hot exhaust products will be directed against the water cooled head of the cylinder and be kept as much as possible out of contact with the valve seat 32.

It will be apparent that the valve assembly described includes readily removable intake and exhaust assemblies, which are pressure operated and require no valve operating mechanisms therefor.

Still further, in the arrangement disclosed, a single valve 34 can be provided which is of greater area than the normally separate intake and exhaust valves provided in the cylinder head. Thus, the maximum rate of flow from the combustion chamber into the passage 26 is possible, since the valves controlling the intake and exhaust conduits do not open directly into the combustion chamber and hence may likewise be of a maximum volume thereby securing maximum rate of flow.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A valve assembly for internal combustion engines comprising a cylinder head having a combustion chamber therein with a passage communicating with said combustion chamber and a main valve controlling flow through said passage, fuel inlet and exhaust conduits communicating with said passage, pressure operated non-return valves disposed in said cylinder head controlling flow between said conduits and said passage, said non-return valves being disposed on opposite sides of said cylinder head, each of said non-return valves comprising a hollow cage open at both ends, said cylinder head having a pair of bores each receiving one of said cages, a flexible sheet in each cage constituting a valve member, the flexible sheet of the intake valve assembly being secured to its cage at its uppermost edge, and the flexible sheet of the exhaust valve assembly being secured to its cage at its lowermost edge.

2. A valve assembly for internal combustion engines comprising a cylinder head having a combustion chamber therein with a passage communicating with said combustion chamber and a main valve controlling flow through said passage, fuel inlet and exhaust conduits communicating with said passage, pressure operated non-return valves disposed in said cylinder head controlling flow between said conduits and said passage, said non-return valves being disposed on opposite sides of said cylinder head, each of said non-return valves comprising a hollow cage open at both ends, said cylinder head having a pair of bores each receiving one of said cages, a flexible sheet in each cage constituting a valve member, said valve members being flat and disposed in inclined planes, one of said valve members being secured at its upper edge to its cage and the other of said valve members being secured at its lower edge to its cage.

References Cited in the file of this patent

UNITED STATES PATENTS

| | | |
|---|---|---|
| 155,667 | Painter | Oct. 6, 1874 |
| 376,473 | Gibbs | Jan. 17, 1888 |
| 639,683 | Neale | Dec. 19, 1899 |
| 842,182 | Dieter | Jan. 29, 1907 |
| 860,630 | Brady | July 23, 1907 |
| 1,096,592 | Beauchamp | May 12, 1914 |
| 1,104,806 | Kahn | July 28, 1914 |
| 1,672,436 | Thege | June 5, 1928 |
| 2,616,403 | Kiekhaefer | Nov. 4, 1952 |
| 2,639,699 | Kiekhaefer | May 26, 1953 |